(12) United States Patent
Terashima et al.

(10) Patent No.: US 10,377,659 B2
(45) Date of Patent: Aug. 13, 2019

(54) OPTICAL FIBER BASE MATERIAL MANUFACTURING APPARATUS

(71) Applicant: Shin-Etsu Chemical Co., Ltd., Tokyo (JP)

(72) Inventors: Masami Terashima, Ibaraki (JP); Takaaki Nagao, Ibaraki (JP); Yuichi Matsunaga, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 61 days.

(21) Appl. No.: 15/673,417

(22) Filed: Aug. 10, 2017

(65) Prior Publication Data

US 2017/0369358 A1    Dec. 28, 2017

Related U.S. Application Data

(62) Division of application No. 14/973,658, filed on Dec. 17, 2015, now Pat. No. 9,758,422.

(30) Foreign Application Priority Data

Dec. 22, 2014   (JP) ................................. 2014-258193

(51) Int. Cl.
 *C03B 37/014*   (2006.01)

(52) U.S. Cl.
 CPC .... *C03B 37/0142* (2013.01); *C03B 37/01406* (2013.01); *C03B 2207/42* (2013.01)

(58) Field of Classification Search
 CPC ........ C03B 37/014–37/01433; C03B 37/0144; C03B 37/01807; C03B 37/01815; C03B 37/01823
 See application file for complete search history.

(56) References Cited

U.S. PATENT DOCUMENTS

2003/0101772 A1   6/2003   Itoh et al.
2004/0060326 A1   4/2004   Ishihara
2005/0061035 A1   3/2005   Kang et al.

FOREIGN PATENT DOCUMENTS

JP   H1-239033 A   9/1989
JP   2001-19439 A   1/2001
JP   2005-89241 A   4/2005

OTHER PUBLICATIONS

Office Action issued for counterpart Japanese Application 2014-258193, issued by the Japan Patent Office dated Jul. 5, 2017.
Office Action issued for counterpart Chinese Application 201510970821.2, issued by the Chinese Intellectual Property Office dated Oct. 16, 2017.

*Primary Examiner* — Lisa L Herring

(57) ABSTRACT

An optical fiber base material manufacturing apparatus including a reaction chamber; a burner that has a portion thereof inserted into the reaction chamber through an insertion opening that creates a connection between the inside and outside of the reaction chamber, and emits a flame toward a starting member positioned within the reaction chamber; and a seal connection member that creates an air-tight seal between the burner and the reaction chamber at the insertion opening. One end of the seal connection member firmly contacts the burner inserted therethrough, another end of the seal connection member firmly contacts the reaction chamber and has a through-hole formed therein through which the burner is inserted without contacting the seal connection member, and the seal connection member includes a connecting portion that connects the one end to the other end, while preventing transfer of stress between the one end and the other end.

18 Claims, 6 Drawing Sheets

OPTICAL FIBER BASE MATERIAL MANUFACTURING APPARATUS

CROSS-REFERENCE TO RELATED APPLICATIONS

This application is a divisional of U.S. patent application Ser. No. 14/973,658, filed on Dec. 17, 2015, which claims priority to Japanese Patent Application No. 2014-258193, filed on Dec. 22, 2014, the contents of each of which are hereby incorporated herein by reference in their entirety.

BACKGROUND

1. Technical Field

The present invention relates to a manufacturing apparatus for an optical fiber base material.

2. Related Art

VAD (Vapor phase Axial Deposition) and OVD (Outside Vapor Deposition) are known as methods for manufacturing an optical fiber base material. With these methods, a silicon compound such as silicon tetrachloride ($SiCl_4$) is provided in an oxyhydrogen flame obtained by burning hydrogen and oxygen in a reaction chamber. A porous base material is grown by depositing silicon dioxide ($SiO_2$) microparticles generated from the silicon compound resulting from the hydrolytic reaction. The porous base material obtained in this manner is heated and sintered, thereby obtaining a transparent optical fiber base material, as shown in Patent Document 1, for example. Patent Document 1: Japanese Patent Application Publication No. H1-239033

However, there are cases where changes occur in the quality of the porous base material during the process for growing the porous base material.

SUMMARY

According to a first aspect of the present invention, provided is an optical fiber base material manufacturing apparatus comprising a reaction chamber; a burner that has a portion thereof inserted into the reaction chamber through an insertion opening that creates a connection between the inside and outside of the reaction chamber, and emits a flame toward a starting member positioned within the reaction chamber; and a seal connection member that creates an air-tight seal between the burner and the reaction chamber at the insertion opening. One end of the seal connection member firmly contacts the burner inserted therethrough, another end of the seal connection member firmly contacts the reaction chamber and has a through-hole formed therein through which the burner is inserted without contacting the seal connection member, and the seal connection member includes a connecting portion that connects the one end to the other end, while preventing transfer of stress between the one end and the other end.

According to a second aspect of the present invention, provided is An optical fiber base material manufacturing method comprising using an optical fiber base material manufacturing apparatus that includes a reaction chamber; a burner that has a portion thereof inserted into the reaction chamber through an insertion opening that creates a connection between the inside and outside of the reaction chamber; and a seal connection member that creates an air-tight seal between the burner and the reaction chamber at the insertion opening. One end of the seal connection member firmly contacts the burner inserted therethrough, another end of the seal connection member firmly contacts the reaction chamber and has a through-hole formed therein through which the burner is inserted without contacting the seal connection member, the seal connection member includes a connecting portion that connects the one end to the other end, while preventing transfer of stress between the one end and the other end, and the method comprises emitting a flame from the burner toward a starting member positioned inside the manufacturing apparatus.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
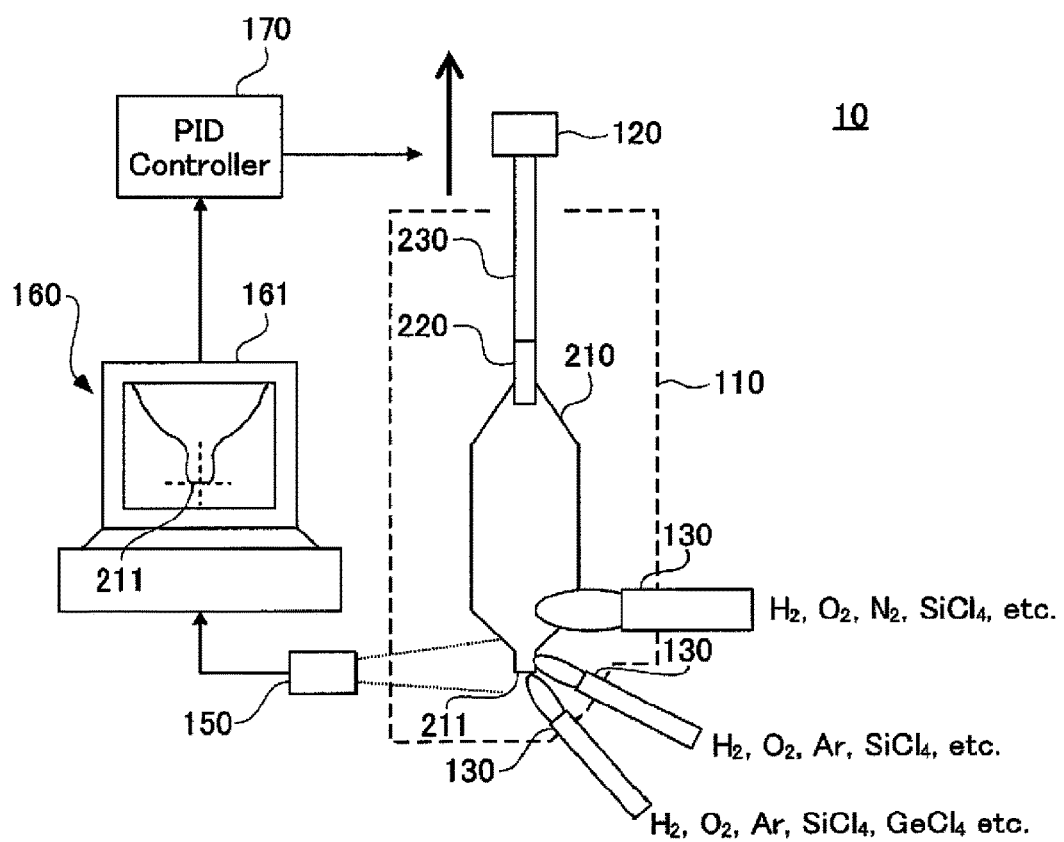
FIG. 1 is a schematic view of a manufacturing apparatus 10 for manufacturing an optical fiber base material 210 using VAD.

FIG. 1 is a schematic view of a manufacturing apparatus 10 for manufacturing an optical fiber base material 210 using VAD. The manufacturing apparatus 10 includes a reaction chamber 110, a raising mechanism 120, a burner 130, a video camera 150, a console 160, and a PID controller 170.

The reaction chamber 110 surrounds a starting member 220 and an optical fiber base material 210 that is formed at the tip of the starting member 220, and isolates the optical fiber base material 210 and the starting member 220 from the outside atmosphere. The starting member 220 at the time when the manufacturing of the optical fiber base material 210 begins and the optical fiber base material 210 that has been attached to the starting member 220 are output from the top end of the reaction chamber 110 in the drawing. Therefore, the reaction chamber 110 may include a lid or the like that opens and closes. The reaction chamber 110 includes an insertion opening on a side surface into which the burner 130 is inserted, and this insertion opening is described further below with reference to FIG. 2.

The raising mechanism 120 has the starting member 220 hanging therefrom inside the reaction chamber 110, via a dummy rod 230, and raises the starting member 220 and the optical fiber base material 210 attached to the starting member 220 upward in the drawing while rotating the optical fiber base material 210 and the starting member 220 on the axis of the starting member 220.

The burner 130 emits a flame onto a region near the bottom end of the starting member 220 hanging within the reaction chamber 110 or onto a region near the bottom end of the optical fiber base material 210 attached to the starting member 220. The burner 130 is a multi-pipe burner made of quartz glass, for example, and the flow rate of the burner 130 can be controlled by a mass flow controller, for example. The burner 130 supplies hydrogen gas and oxygen gas for generating the oxyhydrogen flame, as well as a raw material gas such as $SiCl_4$ serving as a raw material and $GeCl_4$ serving as a dopant raw material, into the reaction chamber 110.

A plurality of burners 130 are arranged in the manufacturing apparatus 10 shown in the drawing. The burner 130 that is arranged at the bottom position in the drawing and deposits soot on the center portion emits raw material gas including a Ge dopant onto the soot deposition body being raised toward the top of the reaction chamber 110 in the drawing, and deposits glass microparticles that become the core having a high refractive index.

A burner 130 that is arranged further upward in the drawing and deposits soot on the surface of the soot deposition body is supplied with raw material gas that does not include the Ge dopant, and deposits glass microparticles with a low refractive index to form the cladding. In this way, a plurality of burners 130 that each have different specifications and supply gases with different compositions are provided.

The video camera 150 captures an image of the region near the bottom end of the optical fiber base material 210 in the drawing, which is the region being grown within the reaction chamber 110. The image captured by the video camera 150 is displayed in a display section 161 of the console 160.

The console 160 detects the raising speed of the optical fiber base material 210 caused by the raising mechanism 120 and calculates the average value of this raising speed, for example. The console 160 compares the average value of the calculated raising speed to a preset raising speed, and calculates the difference therebetween. Furthermore, the console 160 corrects the flow rates of the gases supplied to the burners 130 according to the calculated difference. Yet further, the console 160 controls the raising speed of the optical fiber base material 210 resulting from the raising mechanism 120 via the PID controller 170.

When manufacturing the optical fiber base material 210 using VAD and the manufacturing apparatus 10 described above, in a state where the position and orientation of the burners relative to the reaction chamber 110 are fixed, the flames generated by the burners 130 are emitted toward the starting member 220. As a result, the $SiO_2$ microparticles doped with Ge and the $SiO_2$ microparticles that do not contain Ge generated by the hydrolytic reaction in the oxyhydrogen flames generated by the burners 130 are sequentially deposited to form the optical fiber base material 210.

The deposition floor surface 211 is monitored by the manufacturing apparatus 10 via the video camera 150 and the display section 161, and the raising speed resulting from the raising mechanism 120 is controlled such that the position of the deposition floor surface 211 of the optical fiber base material 210 relative to the burners 130 is maintained at a prescribed height. Furthermore, the average movement over time of the raising speed controlled in the manner described above is monitored, and the flow rate of the gas supplied to the burners 130 is adjusted based on this value, in order to stabilize the raising speed. As a result, the refractive index distribution of the manufactured optical fiber base material 210 is made more consistent in the longitudinal direction of the optical fiber base material 210. In this way, the elongated optical fiber base material 210 is manufactured with a desired stable refractive index distribution across the length thereof.

When forming the optical fiber base material 210, hydrogen chloride generated from the raw material gas and $SiO_2$ microparticles that are not deposited on the optical fiber base material 210 are produced. The release of these materials to the outside atmosphere is undesirable. Therefore, an exhaust pipe connecting to the inside of the reaction chamber 110 is provided, and the exhaust gas including the hydrogen chloride gas, the $SiO_2$ microparticles, and the like may be sent to an external treatment facility.

Figure 2:
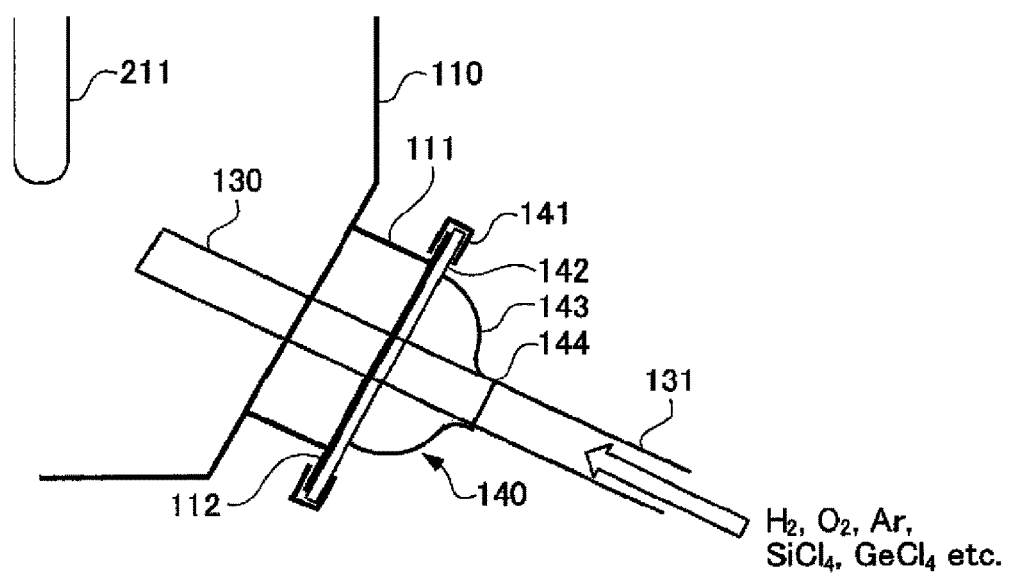
FIG. 2 is a schematic view of a seal structure between the reaction chamber 110 and the burner 130.

FIG. 2 is a schematic view showing the sealing structure between the reaction chamber 110 and the burners 130. Components that are the same as those shown in FIG. 1 are given the same reference numerals, and redundant descriptions are omitted. With the manufacturing apparatus 10 shown in the drawing, an air-tight seal is formed by the burner boot 140 between the reaction chamber 110 and the burner 130.

With the manufacturing apparatus 10 shown in the drawing, a protruding portion 111 is provided as the insertion opening for a burner 130 in the reaction chamber 110. The protruding portion 111 is shaped as a short cylinder passing into the inside of the reaction chamber 110. The protruding portion 111 has a flange portion 112 that expands to the radial outside of the protruding portion 111 formed at the tip thereof, along a surface that intersects the direction in which the protruding portion 111 protrudes. Furthermore, the inner diameter of the protruding portion 111 is larger than the outer diameter of the burner 130 inserted therethrough. Accordingly, the reaction chamber 110 including the protruding portion 111 does not directly contact the burner 130.

With the manufacturing apparatus 10 shown in the drawing, the burner boot 140 is an example of a sealing connection component, and is formed by silicon rubber that is white and translucent. The burner boot 140 includes a hollow connecting portion 143 and a flange portion 142 and end portion 144 at each end of the connecting portion 143. Each flange portion 142 and end portion 144 is open, and it is possible to insert a burner 130 connected to an end portion of a gas supply line 131 into the burner boot 140.

The flange portion 142 of the burner boot 140 is secured relative to the flange portion 112 of the protruding portion 111 of the reaction chamber 110, by a boot pressing jig 141. The flange portion 142 on the burner boot 140 side and the flange portion 112 on the reaction chamber 110 side have substantially the same shape and are firmly attached to each other. As a result, an air-tight connection is established between the reaction chamber 110 and the burner boot 140

The inner diameter of the end portion 144 of the burner boot 140 is slightly less than the outer diameter of the burner 130 inserted into the end portion 144. Therefore, the end portion 144 of the burner boot 140 elastically deforms to stretch as a result of the burner 130 being inserted. Accordingly, the end portion 144 of the burner boot 140 automatically forms a tight connection with the outer surface of the burner 130, as a result of the elastic force of the burner boot 140 itself.

The connecting portion 143 of the burner boot 140 is generally dome-shaped, and has an inner diameter that is substantially equal to the inner diameter of the protruding portion 111 of the reaction chamber 110 on the side where the flange portion 142 is provided. On the side where the flange portion 142 is provided, the burner boot 140 does not contact the burner 130 inserted therein.

The connecting portion 143 of the burner boot 140 has a curved shape at the end surface that includes the central axis of the burner 130. Therefore, when the relative positions of the flange portion 142 side and the end portion 144 side of the burner boot 140 are changed, the connecting portion 143 deforms easily and the transfer of stress between the flange portion 142 and the end portion 144 is cut off. As a result, with the manufacturing apparatus 10, the displacement or deformation of the reaction chamber 110 caused by change in temperature, for example, is prevented from being communicated to the burner via the burner boot 140.

The gas supply line 131 that supplies the raw material gas and the like to the burner 130 may be formed by a flexible material. As a result, when making fine adjustments to the position at which the burner 130 is secured, rigidity of the gas supply line 131 is prevented from becoming an impediment.

It should be noted that the resin material, elastomer, or the like that is the preferred material for the flexible gas supply line 131 is preferably not arranged inside of the reaction chamber 110, in consideration of thermal resistance and oxidation resistance. Accordingly, the back end of the burner 130 extends to the outside of the reaction chamber 110, and the gas supply line 131 is preferably connected to the burner 130 outside of the reaction chamber 110.

Manufactured Example

Figure 3:
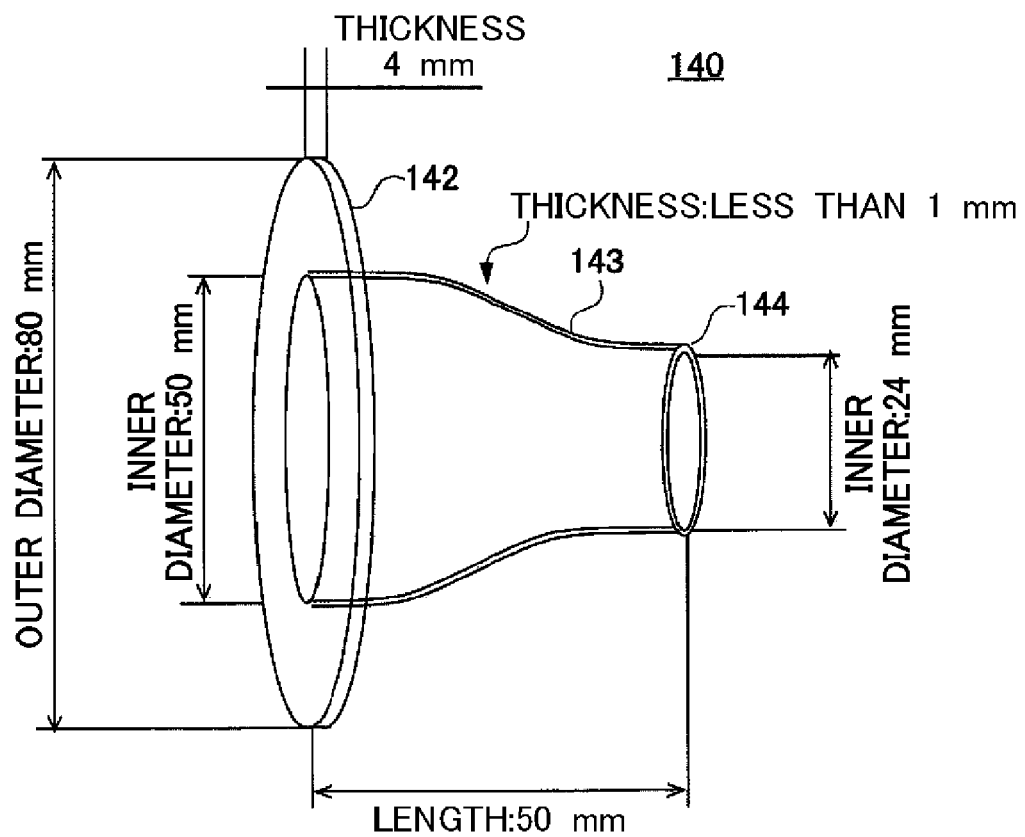
FIG. 3 is a schematic view of the burner boot 140.

FIG. 3 shows an exemplary burner boot 140 in the manufacturing apparatus 10. Components of the burner boot 140 that are the same as those shown in FIG. 2 are given the same reference numerals, and redundant descriptions are omitted. The burner boot 140 of the manufacturing apparatus 10 includes a flange portion 142, a connecting portion 143, and an end portion 144.

In the burner boot 140 that has a total length of 50 mm, the flange portion 142 is positioned on the left side in the drawing, and is a portion that is shaped as a circular lid with a hole in the center. The flange portion 142 has an outer diameter of 80 mm, which is substantially the same as the outer diameter of the flange portion 112 of the protruding portion 111 in the reaction chamber 110. The flange portion 142 has an inner diameter of 50 mm, which is substantially the same as the inner diameter of the protruding portion 111 on the reaction chamber 110 side.

The flange portion 142 of the burner boot 140 has a thickness of 4 mm. Therefore, when sandwiched together with the flange portion 112 of the protruding portion 111 by the boot pressing jig 141, the flange portion 142 elastically deforms to create an air-tight connection with the flange portion 112 on the reaction chamber 110 side. As a result, the end portion on the flange portion 142 side of the burner boot 140 forms an air-tight connection with the reaction chamber 110.

In the manufacturing apparatus 10, the outer diameter of the cylindrical burner 130 inserted into the burner boot 140 is 26 mm. Accordingly, there is a large gap between the burner 130 inserted into the burner boot 140 and the inner surface of the hole of the flange portion 142, such that these components do not contact each other. Therefore, even when the protruding portion 111 of the reaction chamber 110 and the flange portion 142 of the burner boot 140 are displaced due to thermal expansion of the reaction chamber 110, for example, these components do not contact the side surface of the burner 130.

In the end portion 144 of the burner boot 140 positioned on the center right side in the drawing, the inner diameter of the burner boot 140 is 24 mm. As described above, the outer diameter of the burner 130 inserted into the burner boot 140 is 26 mm. Accordingly, when the burner 130 is inserted into the end portion 144 of the burner boot 140, the burner boot 140 elastically deforms by widening from the inside at the end portion 144. As a result of the elasticity of the burner boot 140 that attempts to compensate for this elastic deformation, the end portion 144 of the burner boot 140 forms air-tight contact around the burner 130, and this state is maintained.

At the end portion 144 of the burner boot 140 described above, the inner diameter of the burner boot 140 may decrease while drawing closer to the end portion 144. In this way, the burner 130 can be inserted more easily and the surface area of the portion where the burner 130 and the burner boot 140 are in contact with each other is increased, thereby improving the air-tight seal.

In the burner boot 140, the flange portion 142 and the end portion 144 described above are connected in an air-tight manner by the connecting portion 143. The connecting portion 143 has a total thickness of 1 mm. The connecting portion 143 has a curved cross-sectional shape in a cross section obtained by cleaving along a plane that includes the central axis. Therefore, the connecting portion 143 is dome shaped, and is less rigid than the flange portion 142. Accordingly, when the flange portion 142 is displaced, the stress experienced by the burner boot 140 due to the displacement is barely transferred to the end portion 144 on the opposite side. Furthermore, the displacement experienced on the end portion 144 side is barely transferred to the flange portion 142. In other words, the connecting portion 143 blocks the transfer of stress between the flange portion 142 and the end portion 144.

As a result, the burner boot 140 is easily deformed by the connecting portion 143, and therefore, when adjusting the position of the burner 130, particularly when making fine adjustments, the burner boot 140 having one end secured to the reaction chamber 110 is prevented from interfering with the displacement of the burner 130. Furthermore, while the optical fiber base material 210 is being manufactured, even if the protruding portion 111 and the flange portion 112 are displaced due to thermal expansion of the reaction chamber 110, this displacement is absorbed by the connecting portion 143 of the burner boot 140 and not transferred to the burner 130. Accordingly, regardless of the state of the reaction chamber 110, the position of the burner 130 is stable and it is possible to perform deposition on and raise the optical fiber base material 210 while the angle of elevation or the like of the burner 130 is kept in an initially set state, and to manufacture the optical fiber base material with stable optical characteristics along the length thereof.

Furthermore, even when the relative positions of the burner 130 and the protruding portion 111 of the reaction chamber 110 are changed, the air-tight seal between the burner 130 and the reaction chamber 110 is maintained by the burner boot 140, and the gas inside the reaction chamber 110 does not leak to the outside. Furthermore, impurities are prevented from entering into the reaction chamber 110 through the portion connecting the reaction chamber 110 and the burner 130.

Specifically, in the burner boot 140, the flange portion 142 connected to the reaction chamber 110 and the end portion 144 connected to the burner 130 are distanced from each other. Furthermore, the thick flange portion 142 of the burner boot 140 firmly contacts the flange portion 112 of the protruding portion 111, and therefore, even when the burner boot 140 is deformed, the air-tight seal of the flange portion 142 does not deteriorate. The end portion 144 of the burner boot 140 firmly contacts the burner 130 as a result of the elasticity of the burner boot 140, and therefore, even when the burner boot 140 is deformed, the air-tight seal of the flange portion 142 does not deteriorate. In addition, the connecting portion 143 of the burner boot 140 is soft, and therefore the connecting portion 143 deforms in a manner to follow the displacement of the flange portion 142 and the end portion 144, thereby maintaining the air-tight seal without breaking.

It is obvious that the shape and dimensions of the burner boot 140 are not limited to the example described above. The dimensions can be determined according to the specifications of the reaction chamber 110 and the burner 130 being used. Furthermore, the shape of the burner boot 140 at the flange portion 142 and the end portion 144 can be determined according to the shape of the reaction chamber 110 and the burner 130 used. The connecting portion 143 is not limited to having a dome shape, and can have a variety of shapes such as a stepped shape, a bellows shape, a spindle shape, or the like.

The inner diameter of the burner boot 140 at the end portion 144 may be greater than or equal to 80% and less than 100% of the outer diameter of the burner 130 inserted therethrough. In this way, the air-tight seal between the burner 130 and the burner boot 140 at the end portion 144 is ensured. If the inner diameter of the end portion 144 is less than 80% of the outer diameter of the burner 130, the fastening pressure caused by the end portion 144 is high and there are cases where a burner 130 made of glass would break. Furthermore, if the inner diameter of the end portion 144 is greater than or equal to 100% of the outer diameter of the burner 130, the air-tight seal around the burner 130 at the end portion 144 cannot be ensured.

The burner boot 140 receives the radiant heat of the flame emitted from the burner 130, and is exposed to the hydrogen chloride generated from the reactions in the reaction chamber 110. Therefore, the material for forming the burner boot 140 may have thermal resistance of at least one hundred and tens of degrees and oxidation resistance to hydrogen chloride. By having a suitable flexibility, the stress placed on the burner can be further reduced as a result of the reaction chamber and the like absorbing the thermal displacement.

More specifically, this material can be exemplified by silicon resin or modified silicon resin. If the material used for the burner boot 140 is silicon resin, by setting the thickness of the connecting portion 143 to be at least 0.2 mm and no greater than 3 mm, it is possible to effectively prevent the transfer of stress between the ends of the burner boot 140. Furthermore, by forming the connection portion between the burner boot 140 and the reaction chamber 110 to have a durometer A hardness that is at least 30 and no greater than 60, it is possible to effectively maintain the air-tight seal of the connection portion.

Upon manufacturing a porous glass base material to serve as the optical fiber base material 210 using the manufacturing apparatus 10 described above, no leaking of the generated microparticles or the like to the outside of the reaction chamber 110 was found during the manufacturing. Furthermore, a transparent glass base material was manufactured by sintering the porous glass base material manufactured using the manufacturing apparatus 10. No gas bubbles caused by impurities were found in this transparent glass base material.

Figure 4:
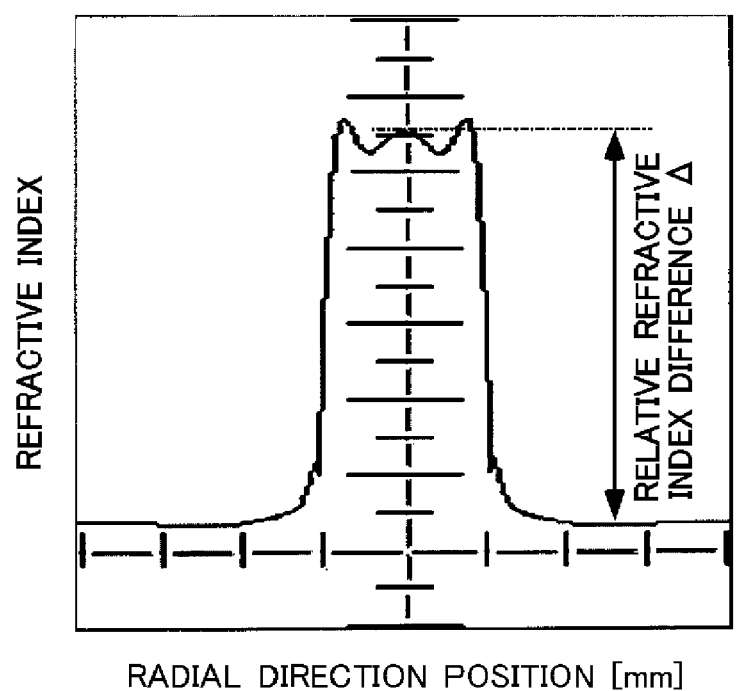
FIG. 4 is a graph showing the refractive index distribution in the radial direction of an optical fiber base material 210.

FIG. 4 is a graph showing the refractive index distribution in the radial direction measured at a certain position in the longitudinal direction of an optical fiber base material 210 with a trunk length of 1200 mm obtained in the manner described above. As shown in the drawing, the region near the center of the optical fiber base material 210 was formed by $SiO_2$ doped with Ge, and therefore had a high refractive index. From the refractive index distribution shown in the drawing, it is possible to calculate the relative refractive index difference $\Delta$ of the optical fiber base material 210, as shown in the drawing.

Furthermore, upon measuring the relative refractive index difference $\Delta$ at intervals of 20 mm along the longitudinal direction of the optical fiber base material 210 described above, it was found that the average value of the relative refractive index difference $\Delta$ was 0.368% and the standard deviation was 0.003(%) across the entire trunk portion of the optical fiber base material 210. In this way, it was found that the standard deviation was small for the optical fiber base material 210 manufactured using the manufacturing apparatus 10 of the embodiment described above.

Comparative Example

Figure 5:
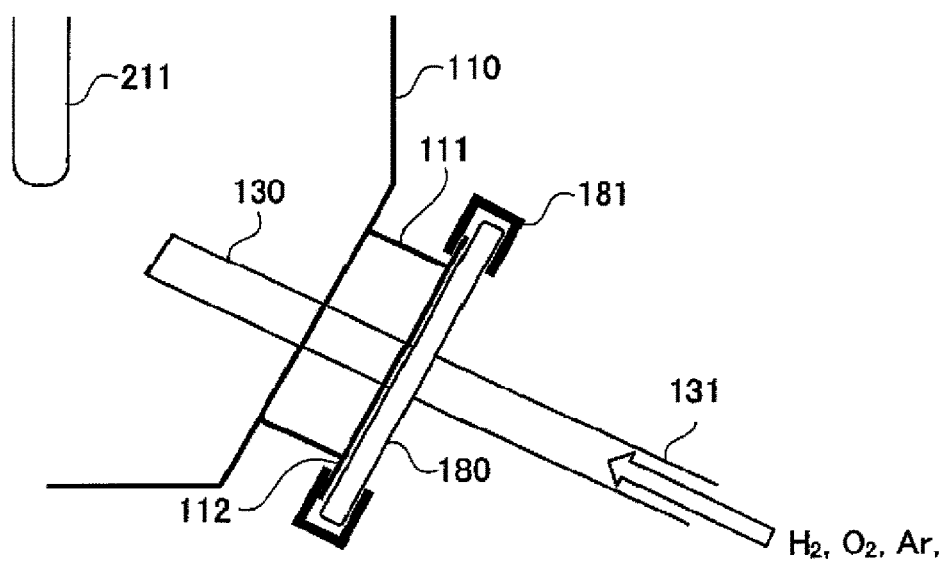
FIG. 5 is a schematic view of a seal structure between the reaction chamber 110 and the burner 130.

FIG. 5 schematically shows the structure of another manufacturing apparatus 20 prepared as a comparison. The manufacturing apparatus 20 has the same structure as the manufacturing apparatus 10 shown in FIG. 1, aside from the points described below, and can be used to manufacture an optical fiber base material 210 using VAD. Components that are the same as those shown in FIG. 1 are given the same reference numerals, and redundant descriptions are omitted.

The manufacturing apparatus 20 differs from the manufacturing apparatus 10 shown in FIGS. 1 and 2 with regard to the shape of the seal member 180 that forms the air-tight seal between the burner 130 and the protruding portion 111 of the reaction chamber 110. Specifically, instead of the burner boot 140 of the manufacturing apparatus 10, the manufacturing apparatus 20 includes a seal member 180 shaped as a round lid.

The seal member 180 is formed of silicon rubber in the same manner as the flange portion 142 of the burner boot 140, and has a through-hole formed in the center thereof. The seal member 180 has an outer diameter of 80 mm, an inner diameter of 24 mm, and a thickness of 4 mm. The outer circumferential edge of the seal member 180 is clamped by a seal pressing jig 181, together with the flange portion 112 of the reaction chamber 110. As a result, the seal member 180 forms an air-tight seal with the reaction chamber 110, thereby creating an air-tight space between the reaction chamber 110 and the seal member 180.

The outer diameter of the burner 130 inserted into the seal member 180 was 25 mm. As a result, the through-hole of the seal member 180 was widened by the burner 130, and an air-tight seal was formed between the seal member 180 and the burner 130 as a result of the elasticity of the seal member 180. In this way, an air-tight seal was formed between the reaction chamber 110 and the burner 130.

Figure 6:
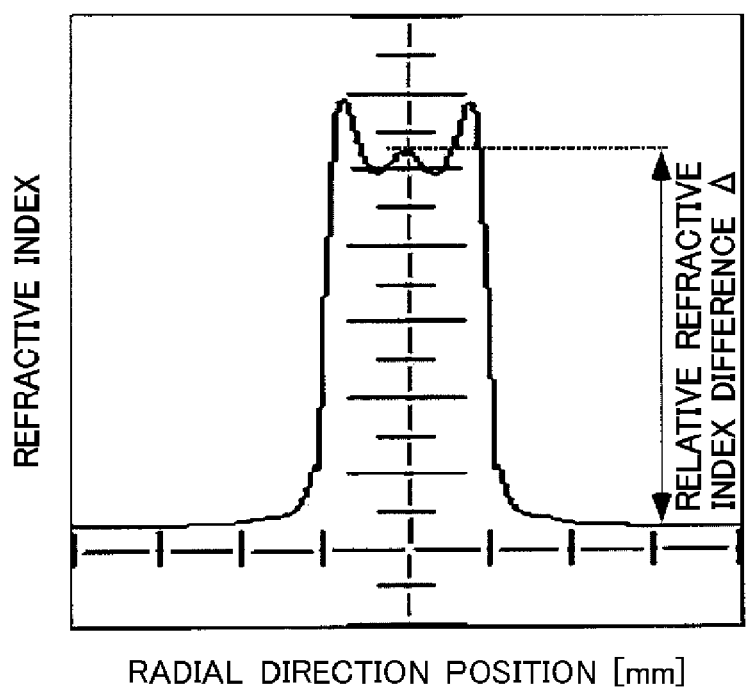
FIG. 6 is a graph showing the refractive index distribution in the radial direction of an optical fiber base material 210.

Aside from using the manufacturing apparatus 20, a porous glass base material was manufactured under the same conditions as the manufactured example. During manufacturing, there was no leaking of generated microparticles to the outside of the reaction chamber, but the angle of elevation of the burner changed slightly due to thermal displacement of the reaction chamber. When this porous base material was heated to become transparent glass, the resulting transparent optical fiber base material 210 had the refractive index distribution shown in FIG. 6.

No gas bubbles caused by impurities were found in the resulting optical fiber base material 210, but upon measuring the relative refractive index difference Δ in the same manner as shown in FIG. 4, it was found that the average value of the relative refractive index difference Δ was 0.343% and the standard deviation was 0.010(%) in the longitudinal direction of the optical fiber base material 210. It was therefore determined that the standard deviation is worse when using the manufacturing apparatus 20 according to the comparative example.

In this way, by using the manufacturing apparatus 10 according to the embodiment described above, leaking of the raw material gas to the outside of the reaction chamber 110 is prevented and stress of the reaction chamber 110 caused by temperature change is prevented from affecting the burner 130. Therefore, fluctuation of the set position and angle of elevation of a preset burner is prevented, and the manufacturing conditions of the optical fiber base material are stabilized. Accordingly, it is possible to manufacture an optical fiber base material that has a stable refractive index profile in the longitudinal direction.

While an embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A method comprising:
    inserting a portion of a burner into a reaction chamber through an insertion opening that creates a connection between the inside and outside of the reaction chamber;
    emitting a flame, using the burner, toward a starting member positioned within the reaction chamber;
    creating an air-tight seal, using a seal connection member, between the burner and the reaction chamber at the insertion opening; wherein
    a first end of the seal connection member firmly contacts the burner inserted therethrough,
    a second end of the seal connection member firmly contacts the reaction chamber and has a through-hole formed therein through which the burner is inserted without contacting the seal connection member,
    the seal connection member includes a connecting portion that connects the first end to the second end, while preventing transfer of stress between the first end and the second end, and
    an inner diameter of the seal connection member decreases from the second end of the seal connection member to the first end of the seal connection member.

2. The method according to claim 1, further comprising:
    raising and rotating, using a raising mechanism, the starting member positioned within the reaction chamber.

3. The method according to claim 1, further comprising:
    ejecting fluid, using an exhaust pipe, from the inside of the reaction chamber to the outside.

4. The method according to claim 1, wherein
    the seal connection member includes the connecting portion that has a curved cross-sectional shape in a cross section including a central axis of the burner.

5. The method according to claim 1, further comprising creating air-tight contact of the seal connection member with a tip of a protruding portion that protrudes to the outside of the reaction chamber and connects the inside and the outside of the reaction chamber.

6. The method according to claim 5, wherein
    the reaction chamber includes a flange portion on a tip of the protruding portion that extends along a surface intersecting a protrusion direction of the protruding portion, and firmly contacts the seal connection member at the flange portion.

7. The method according to claim 6, wherein
    the seal connection member includes a flange portion at the second end that extends radially outward, and firmly contacts the flange portion of the protruding portion at the flange portion to create an air-tight connection.

8. The method according to claim 1, wherein
    the inner diameter is less than the outer diameter of the burner at the first end, and the seal connection member firmly contacts the burner due to a returning force of elastic deformation caused by insertion of the burner.

9. The method according to claim 8, wherein
    thickness of the connecting portion is less than thickness of the seal connection member at least at one of the first end and the second end, and when the at least one of the first end and the second end is deformed, deformation of the connecting portion prevents stress from being transferred between the first end and the second end.

10. The method according to claim 1, wherein
    the seal connection member has thermal resistance to maintain a shape against a flame emitted by the burner, and has oxidation resistance to restrict oxidation due to raw material gas introduced into the reaction chamber.

11. The method according to claim 1, further comprising forming a portion of the seal connection member from a flexible material.

12. The method according to claim 11, wherein
    the flexible material includes resin.

13. The method according to claim 12, further comprising forming the seal connection member from a material including at least one of silicon resin and modified silicon resin.

14. The method according to claim 13, wherein
    the inner diameter is greater than or equal to 80% and less than 100% of an outer diameter of the burner.

15. The method according to claim 13, wherein
    the connecting portion connecting the first end and the second end of the seal connection member has a thickness that is greater than or equal to 0.2 mm and less than or equal to 3 mm.

16. The method according to claim 15, wherein
    the connecting portion connecting the first end and the second end of the seal connection member has a durometer A hardness that is greater than or equal to 30 and less than or equal to 60.

17. The method according to claim 1, wherein the seal connection member is dome-shaped.

18. A method of manufacturing an optical fiber base material using an optical fiber base material manufacturing apparatus that includes a reaction chamber, a burner, and a seal connection member, the method comprising:

emitting a flame from the burner toward a starting member positioned inside the reaction chamber through a portion of the burner inserted into the reaction chamber through an insertion opening that creates a connection between the inside and outside of the reaction chamber, the portion surrounded by the seal connection member, which creates an air-tight seal between the burner and the reaction chamber at the insertion opening, wherein one end of the seal connection member firmly contacts the burner inserted therethrough, another end of the seal connection member firmly contacts the reaction chamber and has a through-hole formed therein through which the burner is inserted without contacting the seal connection member, the seal connection member includes a connecting portion that connects the one end to the another end, while preventing transfer of stress between the one end and the another end, and an inner diameter of the seal connection member decreases from the another end of the seal connection member to the one end of the seal connection member.

\* \* \* \* \*